United States Patent Office 2,939,849
Patented June 7, 1960

2,939,849
N-EPOXYPROPYL PHOSPHORAMIDES AND METHOD OF PRODUCING THE SAME

John G. Frick, Jr., and Richard L. Arceneaux, New Orleans, La., assignors to the United States of America as represented by the Secretary of Agriculture No Drawing. Filed May 1, 1958, Ser. No. 733,232

16 Claims. (Cl. 260—2)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to N-(2,3-epoxypropyl) phosphoramides, to polymers thereof, and to a process for their preparation.

The epoxypropyl phosphoramides of this invention can be represented by the structural formula:

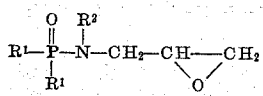

where $R^1$ represents either an alkoxy group, such as methoxy or ethoxy, an aryloxy group, such as phenoxy, or a mono- or di-substituted amido group, such as methylamido or dimethylamido, and $R^2$ represents an alkyl or aryl hydrocarbon group, such as methyl, ethyl, phenyl, etc. These compounds can be polymerized at the epoxy groups to resinous materials which possess a low degree of flammability and are useful in flame retardant formulations for cellulosic materials.

The new compounds of this invention are prepared from phosphoramides which contain a single alkyl or aryl substituent on each nitrogen atom. The alkali metal salt of such a phosphoramide is formed and treated with an epihalohydrin whereby the N-epoxypropyl phosphoramide and an alkali metal halide are produced.

The preparation may be represented by the reactions in the following scheme:

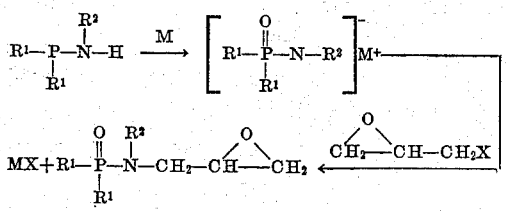

where M represents an alkali metal and X represents a halogen.

Suitable phosphoramides for this reaction include dimethyl N-methylphosphoramidate, diethyl N-methylphosphoramidate, dipropyl N-methylphosphoramidate, dimethyl N-ethylphosphoramidate, diethyl N-ethylphosphoramidate, diethyl N-propylphosphoramidate, dimethyl N-phenylphosphoramidate, diethyl N-phenylphosphoramidate, methyl N,N'-dimethylphosphorodiamidate, ethyl N,N'-dimethylphosphorodiamidate, ethyl N,N'-diethylphosphorodiamidate, ethyl N,N'-diphenylphosphorodiamidate, phenyl N,N'-dimethylphosphorodiamidate, N,N',N''-trimethylphosphoramide and N,N',N''-triethylphosphoramide. The alkali metal salt of these phosphoramides can be formed by the reaction of the compound with the alkali metal in inert solvent, of which aromatic hydrocarbons are particularly suitable. Alternatively the salts of the phosphoramides may be formed from the alkali metal hydroxide in aqueous solution. The reaction in inert solvent, however, is preferable when it is desired to isolate the pure monomeric epoxy compound.

The epoxypropyl phosphoramide is formed by treatment of the alkali metal salt of a phosphoramide, in the solvent in which it was prepared, with an equivalent amount of epichlorohydrin or epibromohydrin. When an inert, organic solvent is used, the alkali metal halide usually precipitates and can be separated from the solution by filtration or decantation. The epoxypropyl phosphoramide can be isolated from the solution by evaporation of the solvent.

Polymerization of the N-(2,3-epoxypropyl) phosphoramides can be accomplished by the use of reagents and catalysts commonly used for the polymerization of epoxy compounds. These include polyfunctional aliphatic and aromatic amines, cadmium fluoroborate, ammonium fluoroborate, and the like.

The following examples illustrate the methods of preparing the compounds of this invention:

Example 1

Diethyl N-methylphosphoramidate, 54 g. (0.32 mole) was treated with 7.0 g. sodium (0.30 mole) in 200 ml. benzene. After the sodium had dissolved completely, the solution was added slowly to 28 g. epichlorohydrin (0.30 mole) at 50° C. The mixture was stirred for 30 minutes after the addition was completed. The solution was decanted from the precipitated solid and the benzene evaporated under reduced pressure. The residual oil was distilled under vacuum to give 24 g. of diethyl N-methyl-N-(2,3-epoxypropyl) phosphoramidate.

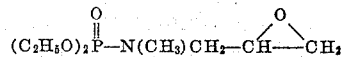

B.P. 108–110 at 1 mm.; $n_D^{25}$ 1.4385.

| Analysis | Found | Calculated |
|---|---|---|
|  | Percent | Percent |
| Nitrogen | 6.0 | 6.3 |
| Phosphorus | 13.3 | 13.9 |
| Oxirane oxygen | 6.4 | 7.2 |

A sample of this product heated with one-half of its weight of ethylenediamine at 140° C. for 20 minutes yielded a thermoplastic, water-soluble resin.

Example 2

Diethyl N-phenylphosphoramidate, 15 g. (0.065 mole) was treated with 1.5 g. (0.065 mole) sodium in 100 ml. benzene. After the sodium had dissolved completely, the solution was slowly added to 6 g. (0.065 mole) epichlorohydrin. The mixture was stirred 4 hours at 60° C. after addition was completed. Petroleum ether, 300 ml., was added to the solution and the precipitate which formed was removed by filtration. The solvents were removed under reduced pressure leaving an oily residue which consisted of diethyl N-phenyl-N-(2,3-epoxypropyl) phosphoramidate.

A sample of this product was mixed with 20% by weight of a 50% cadmium fluoroborate solution, and the mixture heated at 140° C. for 30 minutes. A thermoplastic, water-insoluble resin was obtained.

Example 3

To 30.4 g. (0.2 mole) ethyl N,N'-dimethylphosphorodiamidate dissolved in 200 ml. benzene was added 4.6 g. (0.2 mole) sodium sand. After the sodium had dissolved, the solution was added dropwise with stirring to 20 g. (0.2 mole) epichlorohydrin in 100 ml. benzene at 60° C. Stirring was continued for 1 hour after addition was completed. The precipitate was separated and the benzene evaporated under reduced pressure. Oxirane oxygen analysis indicated that the 34 g. residual oil was ethyl N,N'-dimethyl-N-(2,3-epoxypropyl) phosphorodiamidate.

Heating the product with ethylenediamine gave a thermoplastic resin which would not support combustion.

Example 4

Epichlorohydrin 33 g. and N,N',N''-trimethylphosphoramide, 7 g. were mixed with a solution of 8 g. sodium hydroxide in 35 ml. water. The mixture was stirred for 3 hours, with cooling to keep the temperature between 25 and 30° C. The lower of the two layers that formed in the mixture was separated and evaporated to a semi-solid residue. Extraction of the residue with methanol and evaporation of the methanol yields the 2,3-epoxypropyl phosphoramide as a viscous liquid. Heating this product with 10% cadmium fluoroborate yielded a soft, resinous material.

We claim:

1. A method for producing an N-epoxypropyl phosphoramide which comprises reacting a phosphoramide of the formula

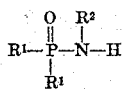

where $R^1$ is selected from the class consisting of alkoxy groups, aryloxy groups, and mono- and di-substituted alkylamido groups and $R^2$ is selected from the class consisting of alkyl and aryl groups, with a member selected from the group consisting of metallic sodium and aqueous sodium hydroxide and with an epihalohydrin of the formula

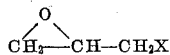

where X is selected from the group consisting of chloro- and bromo- to produce an N-epoxypropylphosphoramide of the formula

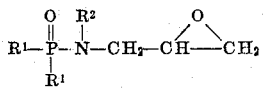

where $R^1$ and $R^2$ have the same significance as above.

2. The process which comprises reacting diethyl N-methyl-phosphoramidate with metallic sodium to produce the sodium salt of said phosphoramidate, then reacting said sodium salt with epichlorohydrin, and recovering diethyl N-methyl-N-(2,3-epoxypropyl) phosphoramidate from the reaction mixture.

3. The process which comprises reacting diethyl N-phenyl-phosphoramidate with metallic sodium to produce the sodium salt of said phosphoramidate, then reacting said sodium salt with epichlorohydrin, and recovering diethyl-N-phenyl-N-(2,3-epoxypropyl) phosphoramidate from the reaction mixture.

4. The process which comprises reacting ethyl N,N'-dimethyl-phosphoramidate with metallic sodium to produce the sodium salt of said phosphoramidate, then reacting said sodium salt with epichlorohydrin, and recovering ethyl N,N'-dimethyl-N-(2,3-epoxypropyl) phosphoramidate from the reaction mixture.

5. The process which comprises reacting N,N',N''-trimethyl-phosphoramide with sodium hydroxide and epichlorohydrin and recovering the 2,3-epoxypropyl phosphoramide of N,N',N''-trimethylphosphoramide from the reaction mixture.

6. A compound having the formula

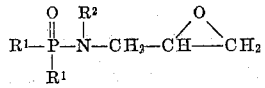

where $R^1$ is selected from the class consisting of alkoxy groups, aryloxy groups, and mono- and di-substituted alkylamido groups and $R^2$ is selected from the class consisting of alkyl and aryl.

7. Diethyl N-methyl-N-(2,3-epoxypropyl) phosphoramidate.

8. Diethyl N-phenyl-N-(2,3-epoxypropyl) phosphoramidate.

9. Ethyl N,N'-dimethyl-N-(2,3-epoxypropyl) phosphorodiamidate.

10. The 2,3-epoxypropyl phosphoramide of N,N',N''-trimethyl-phosphoramide.

11. The process for producing resinous polymers which comprises heating an N-epoxypropyl phosphoramide of the formula

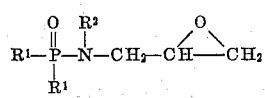

where $R^1$ is selected from the class consisting of alkoxy groups, aryloxy groups, and mono- and di-substituted alkylamido groups and $R^2$ is selected from the class consisting of alkyl and aryl, in the presence of a catalyst selected from the group consisting of cadmium fluoroborate, ammonium fluoroborate, and polyfunctional aliphatic and aromatic amines.

12. A resinous polymer obtained by heating an N-epoxypropyl phosphoramide of the formula

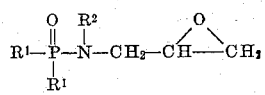

where $R^1$ is selected from the class consisting of alkoxy groups, aryloxy groups, and mono- and di-substituted alkylamido groups and $R^2$ is selected from the class consisting of alkyl and aryl, in the presence of a catalyst selected from the group consisting of cadmium fluoroborate, ammonium fluoroborate, and polyfunctional aliphatic and aromatic amines.

13. The resinous polymer of claim 12 wherein the N-epoxypropyl phosphoramide is diethyl N-methyl-N-(2,3-epoxypropyl) phosphoramidate.

14. The resinous polymer of claim 12 wherein the N-epoxypropyl phosphoramide is diethyl N-phenyl-N-(2,3-epoxypropyl) phosphoramidate.

15. The resinous polymer of claim 12 wherein the N-epoxypropyl phosphoramide is ethyl N,N'-dimethyl-N-(2,3-epoxypropyl) phosphorodiamidate.

16. The resinous polymer of claim 12 wherein the N-epoxypropyl phosphoramide is the 2,3-epoxypropyl phosphoramide of N,N',N''-trimethyl-phosphoramide.

No references cited.